UNITED STATES PATENT OFFICE.

EDWARD R. HEWITT, OF RINGWOOD, NEW JERSEY, ASSIGNOR TO HEWITT MOTOR COMPANY, OF NEW YORK, N. Y., A CORPORATION OF NEW YORK.

AUTOMOBILE.

1,077,197. Specification of Letters Patent. Patented Oct. 28, 1913.

Application filed May 2, 1907. Serial No. 371,456.

*To all whom it may concern:*

Be it known that I, EDWARD R. HEWITT, a citizen of the United States, resident of Ringwood, in the county of Passaic, State of New Jersey, have invented certain new and useful Improvements in Automobiles, of which the following is a specification.

My invention relates to automobiles, and more particularly to the radiator or device or devices carried adjacent to the main portion of the vehicle, and has particular reference to the method of supporting such devices with respect to the main portion of the automobile.

In accordance with the invention it is sought to support the radiator at the forward end of an automobile so as to relieve the same from the jars of the automobile, but at the same time to be supported securely in its proper relation to the vehicle body.

In the use of water-cooled gas engines in automobiles, a considerable amount of water must be carried on the vehicles. The present preferred method of cooling such water involves conducting it by piping from the engine jacket to the forward end of the vehicle and passing it through a cellular tank or multiple tube radiator. The general practice has now resulted in locating such heat-radiating means at the front of the vehicle, and the means so located in the various forms now usual, I will hereinafter refer to as the radiator. To secure a large surface contact with the air, these radiators are made of considerable size, and usually shallow, longitudinally of the vehicle, and extending transversely and vertically to a relatively great extent so as to expose an ample surface to the air for effective cooling as the vehicle is moving. Furthermore, to get most effective radiation from the cooling water, the walls of the radiator in the most approved forms, known as cellular radiators, or their modifications, are extremely thin. The large size and the very thin walls of these radiators make them illy adapted to stand excessive jar when heavily weighted with water as they are when in actual use. It will be seen that my invention, among other things, affords means for using the lightest construction of radiator with consequent high efficiency in radiation, with entire elimination of the liability to rupture of the joints or walls, or any other injury.

While it will be understood that my invention may be used in a variety of forms, designs or constructions, I will now describe one particular embodiment, reference being had to the drawings hereto annexed and forming a part hereof.

Figure 1:
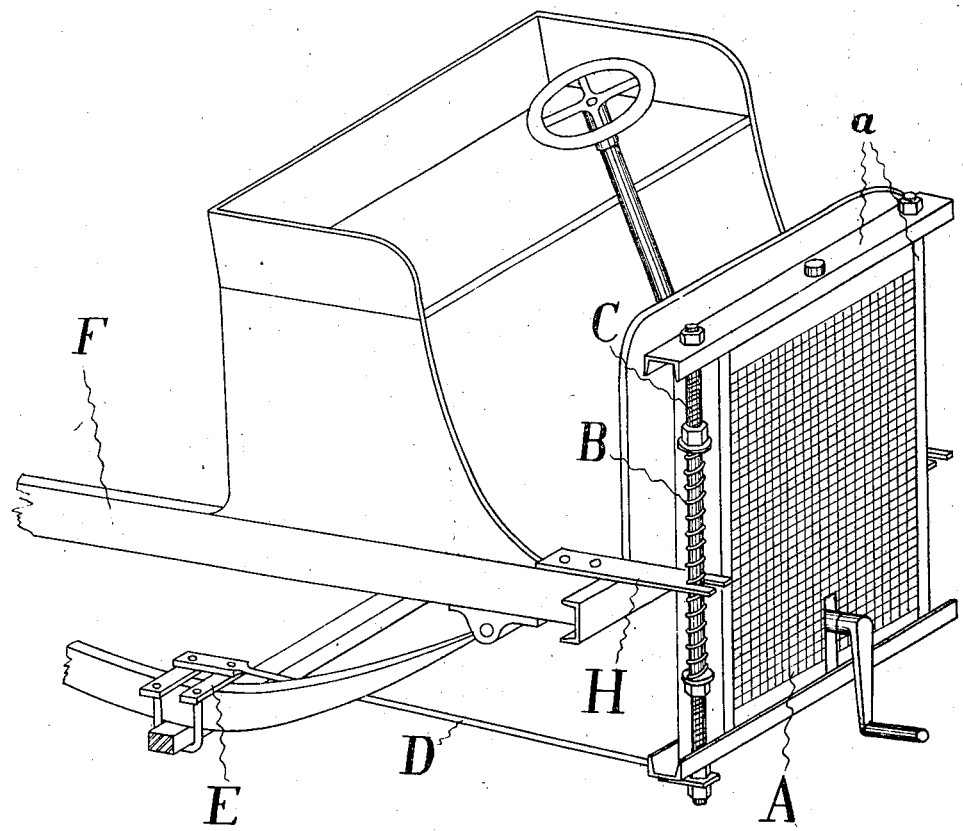
Figure 2:
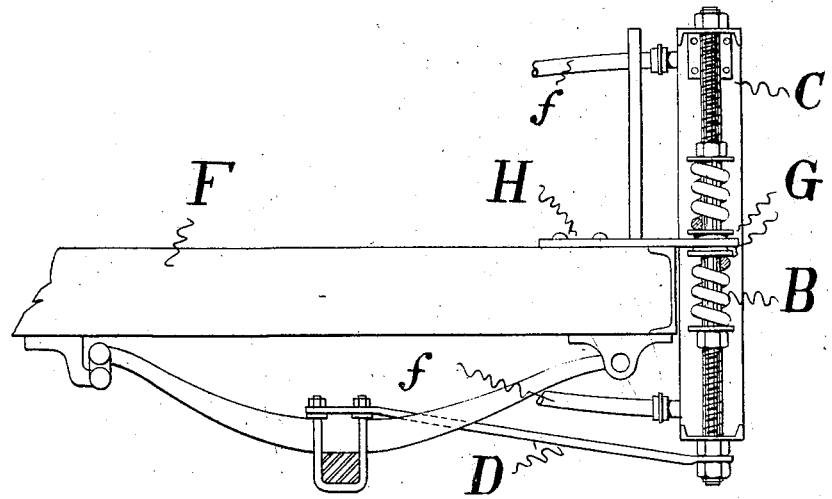
Figures 3, 4:
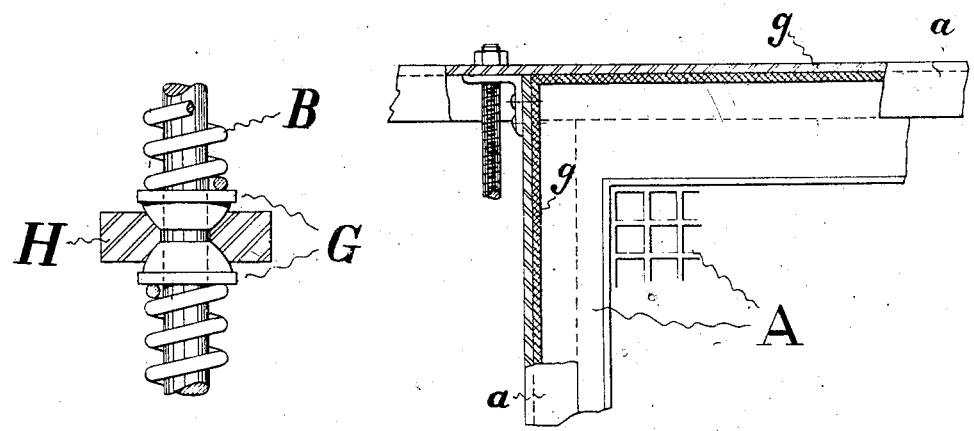

Figure 1 is a perspective view of the forward end of an automobile showing a cellular radiator supported in advance of the frame proper of the vehicle, and the seat and steering pillar; Fig. 2, is a side elevation of the forward end of an automobile frame, showing a radiator and the means of support therefor with respect to the other parts of the automobile; Fig. 3, is a detail of the connection between the main frame supporting bar and the radiator rod and spring connections; Fig. 4, is a front elevation, partly in section, of one corner of the radiator showing the relation of the radiator proper and frame packing.

In this embodiment A represents a radiator of any approved type; B, are the springs yieldingly supporting the frame of the radiator and permitting vertical movement; C, are the guide rods of the cooler frame $a$, which insure a truly vertical reciprocatory movement; D, is one of the steadying or locating rods of which a duplicate is attached to the far side of the radiator frame $a$, at the lower end of the guide rod C at the far side; E, is the spring clip securing the spring to the axle which is shown broken off; F, is the side sill of the chassis of the vehicle proper; G G are retaining cup washers engaging with corresponding depressions or recesses on the upper and lower faces of supports H, which are rigidly attached to the vehicle proper and are formed at their free ends with guide slots in which rest loosely the vertical guide rods C; $f$, indicates the portion of the two pipes leading to the radiator A, which are utilized to complete the circulation of cooling water to and from the engine jacket; $g$, is felting or other suitable material between the radiator body proper and the frame $a$.

The main body portion A of the radiator is, for efficiency, built up of thin copper sheet, brazed or otherwise jointed. In the case of large trucks the gas engine used is of large size, and, owing to the slow movement of the vehicle, as a rule requires more cooling water, or at least more cooling effect, than vehicles for other purposes which move through the air more rapidly. Such circumstances may necessitate the use of an unusually heavy radiator, or at least a large radiator which when completely filled with water is a great weight considering the delicate construction, and comparative thinness of walls and consequent weakness of joints. The movement of the vehicle over rough roads or city streets causes jar and vibration of the vehicle, which in the ordinary construction now used correspondingly jars the radiator, because it is now the invariable practice to inflexibly mount the radiator to the main frame of the vehicle. In my construction the radiator is supported in the framing $a$, shown as channel iron sections packing $g$ being placed between the iron and the walls of the radiator, which prevents abrasion and permits the construction of the complete radiator casing of uniformly light material, or at least avoids the necessity of mechanically attaching reinforced or heavy outside walls. Such packing may also be made of sufficient thickness to absorb to some extent the vibration which would otherwise be transmitted to the radiator proper A. The sides of the channel irons at the same time confine the portion A without the necessity of bolts or other close-fitting or rigid attaching means. The fixed supports H extend from the frame proper of the vehicle F to the guide rod C, which extends between and is rigidly connected to the upper and lower members of the frame $a$, so that the radiator as a whole can move vertically with respect to the vehicle proper by the movement of the guide rods through the slots in the projecting ends of the fixed bars H.

To support the radiator in a normal position of the springs B, B engage at one end with adjustable nuts on the guide rods, and at the other and adjacent ends seat on the cupped washers which are in contact with the fixed bars H. The guide rod, moving freely through the cupped washers, permits vertical movement of the radiator as a whole with respect to the vehicle, depending only upon the resistance of the springs. It will therefore be seen that I can adjust the springs to preserve the radiator in any desired normal position, while the tension of the springs can be adjusted to resist, more or less, the vibration of the vehicle as may be found desirable.

From the lower end of the guide rod, and attached rigidly to each, I carry the bar D substantially horizontal to a portion of the vehicle proper related to the frame F, in a manner which makes the rod D effective as a steadying or positioning rod to retain the radiator frame in a vertical position. It will thus be seen that the steadying rod and the fixed bar H, which supports the cupped washers G, on which seat the sustaining springs, constitute a supporting means for the radiator, and preserve it in substantially fixed relation to the body so far as lateral movement is concerned, while the springs B effect practically a floating support with respect to any vertical movement. The movement of the radiator in the direction of the movement of the vehicle is not subject to jar owing to the inertia of the mass involved and the speeds usual. On the other hand, the passage over uneven surfaces causes sudden displacements of the mass, producing vibration and jar in the body or frame of the vehicle. In the practice of my invention it will be seen that such vibration of the body or frame is not transmitted to the radiator, but is cushioned, and to a large extent entirely absorbed, resulting in many advantages which have in part been heretofore described. In view of the relative movement of the radiator with respect to the vehicle proper, I use either a flexible coupling for the water connection F from the rear of the radiator at its top, or else make the hole through which the water connection passes of ample size to permit the maximum vibration of the vehicle with respect to the radiator. The lower connection with the water cooling system of the engine is likewise sufficiently flexible to be unaffected in its service by any vibration of the vehicle. In addition to the above results incident to the practice of my invention, it will be seen in the particular form described that ready detachability is secured. By the removal of the nut at the lower end of each guide rod, the steadying bar D is detached, while a spreading apart of the two cupped washers G permits the sliding of each guide rod out of the slot or crotch at the forward end of the bar H. The usual ready couplers serve to disconnect the pipes leading to and from the engine jacket. In this manner the entire radiator with its frame can be readily detached for repair or replacement, and as readily remounted. Similarly I may remove the nut at the upper end of each guide bar, thereby freeing the upper frame member $a$ from the radiator, and permitting that frame member to be entirely removed and the radiator proper or cellular structure removed for repair or replacement. Any form of mechanical connection between the upper frame member and the sides affords ready means for effecting this.

It is usual to permit the end of the shaft of the engine or an extension thereto to project beyond the front of the vehicle to a convenient extent for attachment of a starting crank, and accordingly I provide a slot (instead of the usual close-fitting hole) at the point where the starting crank hub or shaft passes through the radiator when the location of the shaft with respect to the radiator makes this necessary.

The entire arrangement, it will be seen, enables the most advantageous mounting of the radiator away from missiles which are frequently kicked up by the wheels of the vehicle. The arrangement in the front of the vehicle also permits there the usual advantages which have been the cause for this disposition becoming standard practice, and neither detracts nor interferes in any way with such advantages, but on the other hand permits the combining therewith of many very advantageous features which have already been amply proven by my reduction to practice.

While I have shown my construction as applied in one particular form, it will be understood that my invention is not limited to such, but is capable of embodiment in various forms and in various manners, and on or in connection with various objects or parts.

What I claim, and desire to secure by Letters Patent, is:—

1. In an automobile, the combination with the chassis therefor, of a radiator, upper and lower frame members in which the radiator is removably secured, rods to fasten said frame members on the radiator, guide means carried by the chassis and engaging the rods loosely intermediate their ends, springs seated on said last named means and abutments for the free ends thereof adjustably carried by the rods.

2. In an automobile, the combination with the chassis therefor, of a radiator, flexible pipe connections between the radiator and the motor, upper and lower frame members in which the radiator is removably secured, means to fasten said frame members on the radiator, said means including threaded rods vertically disposed, guide members carried by the chassis and slotted at their free ends to receive loosely the vertical rods, cup washers carried loosely on the rods and bearing against the upper and lower faces of the guide members, springs seated on the washers, nuts threaded on said rods to form adjustable abutments for the free ends of the springs, and links connecting the lower ends of said rods and a relatively fixed part of the automobile.

In testimony whereof I have signed my name to this specification at the borough of Manhattan, city and State of New York, on the 30th day of April 1907, in the presence of two subscribing witnesses.

EDWARD R. HEWITT.

Witnesses:
GEORGE A. WARD,
HERMANN F. CUNTZ.